July 31, 1951 — E. H. PIRON — 2,562,573
HIGH-SPEED RAIL TRUCK
Filed March 13, 1947 — 4 Sheets-Sheet 1
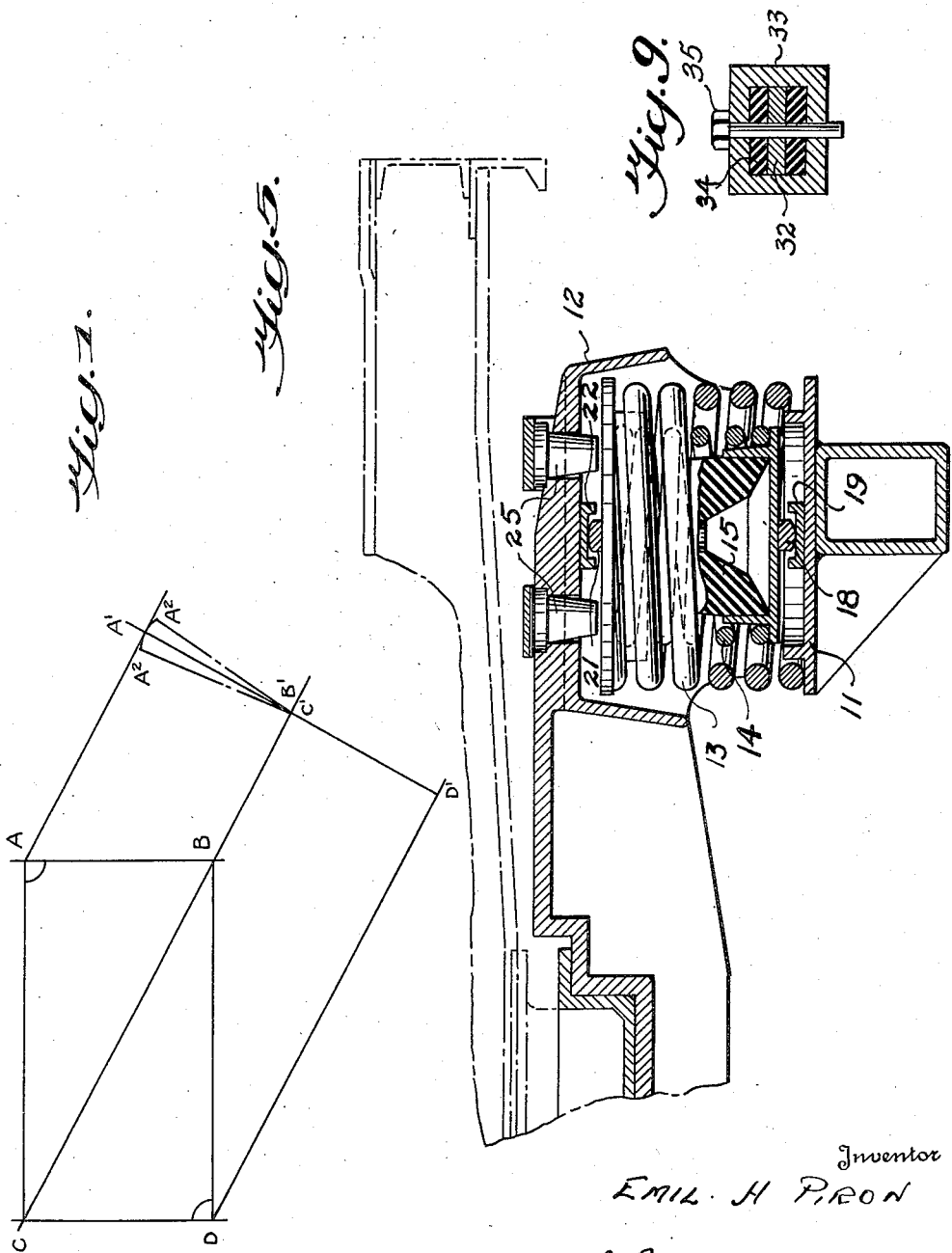
Inventor
EMIL H. PIRON
By [signature]
Attorney July 31, 1951      E. H. PIRON      2,562,573
HIGH-SPEED RAIL TRUCK
Filed March 13, 1947      4 Sheets-Sheet 2
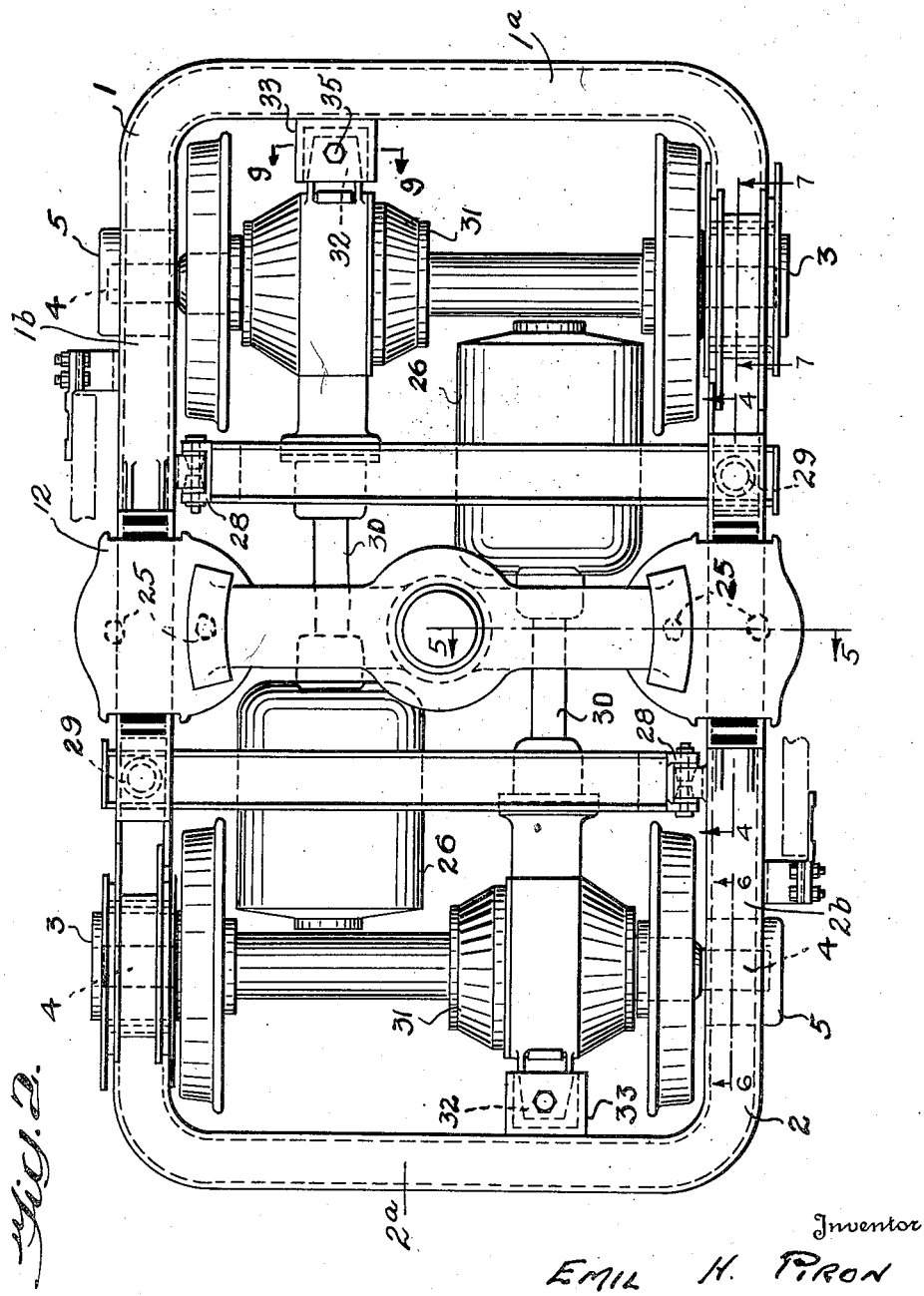
Inventor
EMIL H. PIRON
By Windsor Davis
Attorney July 31, 1951  E. H. PIRON  2,562,573
HIGH-SPEED RAIL TRUCK
Filed March 13, 1947  4 Sheets-Sheet 3

Inventor
EMIL H. PIRON
By Windsor Davis
Attorney

July 31, 1951 E. H. PIRON 2,562,573
HIGH-SPEED RAIL TRUCK
Filed March 13, 1947 4 Sheets-Sheet 4
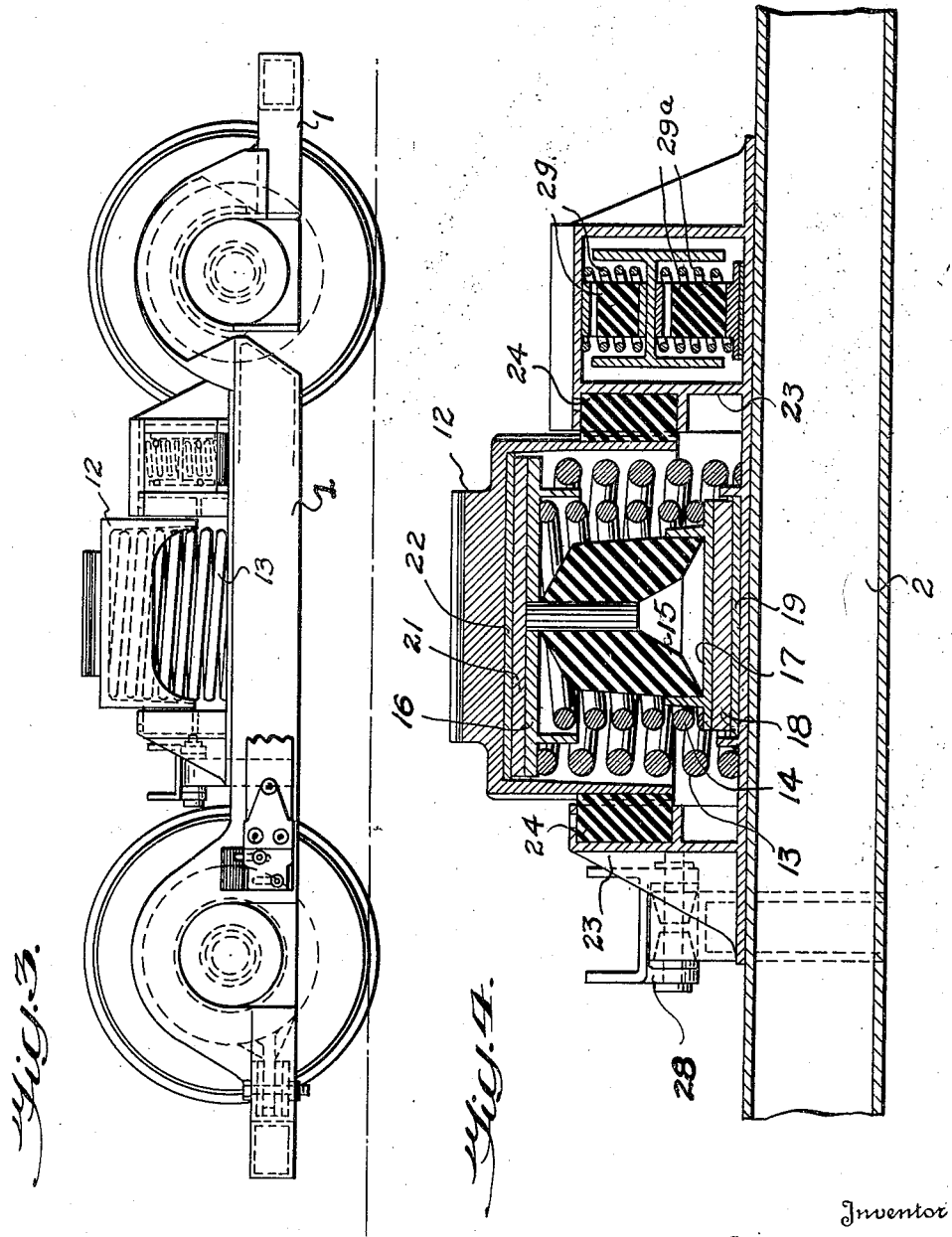
Inventor
EMIL H. PIRON
By Windsor Davis
Attorney Patented July 31, 1951

2,562,573

UNITED STATES PATENT OFFICE 2,562,573

HIGH-SPEED RAIL TRUCK

Emil H. Piron, New York, N. Y., assignor to Transit Research Corporation, New York, N. Y., a corporation of New York Application March 13, 1947, Serial No. 734,339

4 Claims. (Cl. 105—182)

The invention relates to rail trucks of the general type employing outboard bearings and which may suitably, but not necessarily, be equipped with its own propulsion motors. The truck, as illustrated, is particularly adapted for moderately high speed service such as subways and rapid transit lines. Without motors and when built of suitable size it is adaptable for use on steam railway lines.

An object of this invention is to provide a truck composed of the minimum number of parts, which will give maximum riding comfort, which will be very reliable and hence suitable for such dangerous service as subways, and which will require small maintenance for uniform service over prolonged periods of time.

Another object is to provide improved truck bolster supports without the use of swing links, the supports being composed of a spring nest supporting each end of the bolster directly from the truck springs. The essence of this part of the invention lies in the provision of adequate springing of the bolster for relative vertical movements according to a predetermined load deflection curve and in the use of the spring nests to provide resistance to lateral movements of the bolster according to a different predetermined load deflection curve, each curve ascending, if desired, according to a different increasing load deflection ratio under increasing loads.

Another object is to provide a truck frame which is very resistant to distortion in a horizontal plane but which is composed of two main parts hinged for relative pivotal movement diagonally of the frame in vertical arcs. Trucks generally capable of this action are revealed in my two prior applications Serial Number 614,374, filed September 4, 1945, and Serial Number 669,323, filed May 13, 1946, and the truck herein is distinguishable therefrom in that the hinge action occurs at the axles and furthermore, in that the two truck halves are removable from each other and from the axles merely by relative vertical lifting movements.

A further object is to provide a two-part truck frame as above described in which the two parts or halves are separated by a resilient pad through the medium of which the hinging action will ordinarily, but not necessarily, occur.

Other objects and advantages will become hereinafter more fully apparent as reference is had to the accompanying drawings in which my invention is illustrated and in which Figure 1 is a diagrammatic illustration of the motions of my improved truck frame halves with respect to each other.

Figure 2 is a top elevation of my improved truck,

Figure 3 is a side elevation of the truck,

Figure 4 is a vertical section taken along the line 4—4 of Figure 2,

Figure 6:
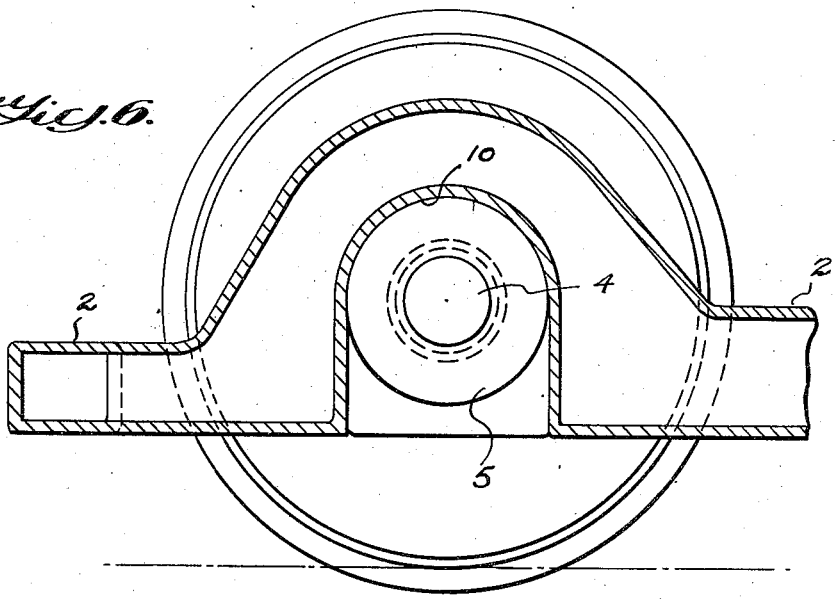
Figure 7:
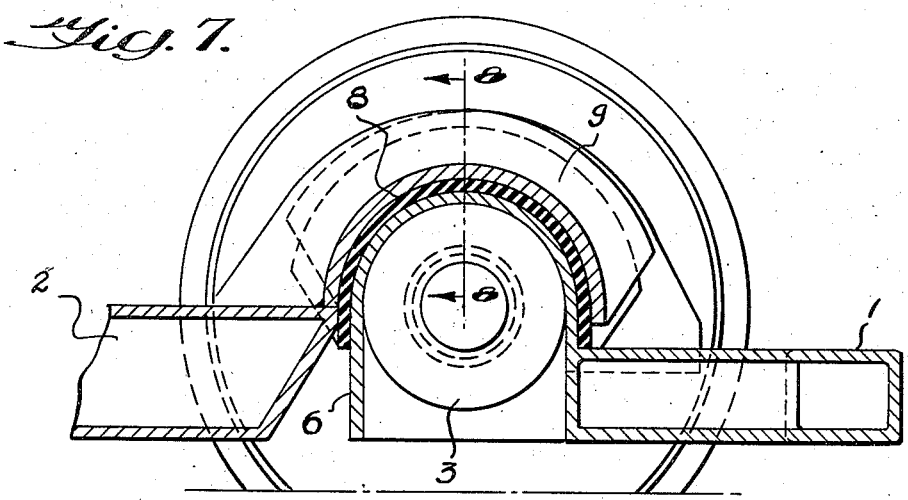
Figure 8:
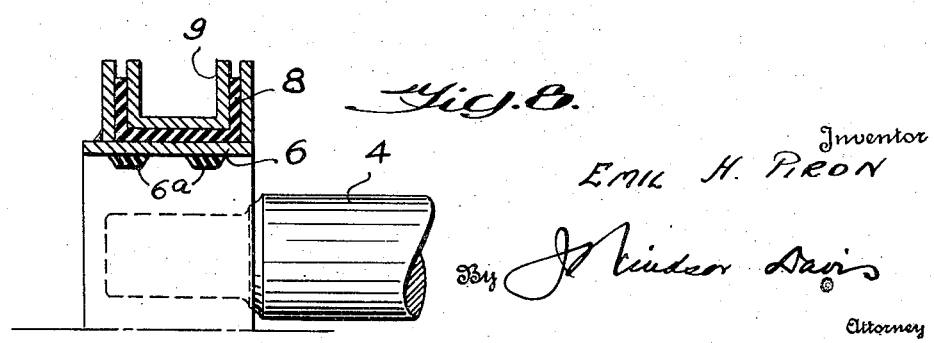

Figure 5 is a vertical section of one end of the bolster, showing the spring assembly in elevation and its supporting rail in section, Figure 6 is a vertical section taken along the line 6—6 of Figure 2, the journal bearing being shown in elevation, Figure 7 is a vertical section taken along the line 7—7 of Figure 2, the bearing being shown in elevation, Figure 8 is a vertical section taken along the line 8—8 of Figure 7, and Figure 9 is a detail vertical section taken along the line 9—9 of Figure 2.

Referring first to Figures 2 and 3, the main truck frame is composed of two main members 1 and 2, each of which overlays a journal bearing 3 at one end of one axle 4 and terminates at the opposite end of the journal bearing of the other axle 4 so that the two junctions of the frame ends are at diagonally opposite corners of the truck frame. The construction of the frame ends is best illustrated in Figure 7 in which it is seen that the frame end 6 of the frame member 1 is "goose-necked" with an internal semicylindrical shape to receive the bearing 3 and open at its lower end so the frame 1 may be disengaged from contact with this bearing merely by vertically elevating the member. Internal flanges 6a on the frame end 6 engage corresponding grooves in the periphery of the bearings 3 to contain the bearings laterally with respect to the frame. The external surface of the end 6 is also semicylindrical and covered by a resilient pad 8. The end 9 of the member 2 being also "goose-necked" and having an internal semicylindrical shape to fit the exterior surface of the pad 8. The other end of the member 1 is constructed similarly to the end 9 of the member 2 (as illustrated in Figure 7) and the other end of the member 2 is constructed similarly to the end 6.

The frame member 2 is formed to provide a semicylindrical socket 10 to receive one journal bearing 5, as shown in Figure 6. This bearing fits the socket closely, as do the other sockets previously described so that there is no fore and aft or lateral motion between the frame members and the axles. The frame member 1 is formed similarly to the showing in Figure 6 at the other journal bearing 5; both members being similarly open below the journal bearings so that elevation of the members disengages them from engagement with the journal bearings.

It will thus be seen that the truck frame is composed, essentially, of the two similar main members 1 and 2. The member 1 is composed of an end portion 6 directly overlying one journal bearing 3, an integral cross-member 1ª extending the width of the truck and which is, in turn, integral with the side sill 1ᵇ. The side sill 1ᵇ has a goose-necked portion to receive the bearing 5.

illustrated in the upper right corner of Figure 2 and is identical with the showing in Figure 6. The side sill 1ᵇ then terminates at the journal 3, shown in the upper left corner of Figure 2, in an end formation identical with the end formation 9 of Figure 7. The sill 1ᵇ at that end overlies the end of the member 2 which directly overlies the journal bearing 3 and which is shaped identically to the formation of the end 6 of the member 1, illustrated in Figure 7. The member 2 then continues through its integral cross-member portion 2ᵃ to its integral side sill portion 2ᵇ. The side sill 2ᵇ has a goose-necked portion 10 as illustrated in Figure 6 and as illustrated in the lower left hand corner of Figure 2 which overlies a journal bearing 5. It then terminates in the end 9 at the lower right hand corner of Figure 2, as illustrated in Figure 7. Thus, at the lower right hand bearing of Figure 2 one end of the member 1 directly overlies a bearing 5 and is overlapped by an end of the member 2 while at the upper left hand bearing an end of the member 2 shaped identically to the end 6 of the member 1 overlies that bearing 3 and is overlapped by an end of the member 1 shaped identically to the end 9 of the member 2.

By this frame construction the frame is very rigid against diagonal distortion in a horizontal plane, but is capable of flexing in response to elevation of any wheel with respect to the other wheels. This is graphically illustrated in Figure 1 in which AB and CD represent the axles. If a force along the line DB, representing a side of the truck, is set to oppose a force in opposite direction operating on the other side frame AC the frame will offer great resistance to distortion. However, if any wheel, as at the corner A, is elevated or depressed through a distance $A^1A^2$, no other wheel is elevated since the effect is movement of the wheel A through the angle $A^1B^1$ (or $C^1$)$A^2$. In other words, from an inspection of Figures 2, 6 and 7, it is clear that the journal bearings 5 and hence the ends of the axles 4 contained in the bearings 5 have no relative fore and aft or lateral movement with respect to the frame members 1 and 2 so that the axles 4 must form a right angle with the side sills as seen at the lower left hand corner and upper right hand corner of Figure 2. However, inspection of Figure 7, illustrative of the construction at the other two corners of the frame, shows that the frame end 9 may move with respect to the frame end 6. If the journal bearing 5 is depressed by reason of its wheel rolling into a track depression, for instance, the frame end 6 will follow the journal bearing downwardly as will the frame end 9. The connection illustrated thus constitutes a hinging of the frame members 1 and 2 at diagonally opposite corners and permits elevation or depression of any one of the four wheels of the truck without any tendency to lift or depress either of the other three wheels.

The main members 1 and 2 are each provided with a spring seat 11, welded thereto intermediate the axles 4. Each of these spring seats receives a nest of springs which support the bolster 12 for vertical and lateral movements with respect to the frame members. The spring nests are best illustrated in Figure 4 in which three concentric springs 13, 14 and 15 are illustrated. The outer spring 13 is a large coil spring which rests directly on the spring seat 11 and which receives a spring cap 16 on its upper end. The spring 14 is also of the coil type and rests upon a spring seat 17 which may rock in a transverse direction about a round bottom fulcrum 18 welded to the bottom thereof and received by a socket 19 secured in the spring seat 11. The top of this spring 14 receives the spring cap 16 jointly with the coil 13. The third spring 15 is composed of rubber of the type which resists vertical distortion by a combination of shearing, compression and bending stresses. This spring is received at its lower end by the spring cap 17 and extends upwardly for contact by the spring cap 16. A shaft 20 extends freely through a central opening in the spring 15 and is welded to the cap 16. An elongated bar 21 is welded to the top of the seat 16 and is rounded at its top for rocking engagement with an elongated seat 22 welded to the bolster 12. A fulcrum for transverse rocking movement of the bolster is thus provided.

The action of the bolster is as follows: under vertical loading of the spring nests by the bolster 12 under light load condition—that is, when the weight of an empty, stationary car body rests thereon, the springs 13 and 14 are deflected but there is no resistance by the spring 15. Additional static load and dynamic loading are resisted jointly by all springs, the load deflection ratio of this combination increasing with increasing loading with the result that the springing becomes stiffer with increasing loading. The rubber spring 15 may be omitted in which case the vertical load deflection ratio will be substantially constant.

The spring seat 11 has two brackets 23 arising therefrom, one fore and one aft of the bolster. Each of the brackets has a pocket to receive a block of rubber 24 which has rubbing contact with the bolster 12. These blocks 24 guide the bolster in its vertical movements with respect to the frame members, they are the means through which a substantial portion of the driving and retarding forces are transmitted between the frame members and bolster and they constitute snubbers to damp the action of the springs 13, 14 and 15. It may be noted in this connection, that if the springs 13 and 14 are made slightly larger than hereinabove contemplated and if the snubbers are sufficiently in pressure contact with the bolster, the springs 15 may be omitted, and that they may, likewise, be omitted if shock absorbers are added between the bolster and the frame members.

The purpose of the pivotal spring seats 16 and 17 is to alter the characteristics of the springs 13, 14 and 15 under lateral movements of the bolster. This lateral movement, which is analogous to the swinging movements provided by conventional swing links, is resisted by bending stresses in the spring 13 due to the fact that its bottom coil rests solidly on the spring seat 11. The springs 14 and 15 merely tilt as the fulcrums 18 and 21 rock in their sockets.

The resistance offered by the spring 13 may be increased by permitting its upper coil to rest solidly on the bolster 12, however, I have found that the lateral resistance should be small, initially and increase with increasing movement of the bolster. In other words, if the resistance to lateral movement of the bolster is soft enough to provide maximum riding comfort it must necessarily be brought to a rather sudden stop by some motion limiting means when turning corners and at times other than those that may be classified as ordinary straight lines riding conditions. In order to provide an increasing load deflection ratio I provide rubber buttons 25, as best seen in Figure 5. These small rubber buttons or cylinders are carried by the bolster and, when the bolster is centered, they may lightly contact the top of the spring cap 16. The sockets in the bolster which receive the buttons 25 are preferably tapered at their outer end to provide room for the rubber of the buttons to distort. Obviously, there is a wide range of choice in the selection of the kind and hardness of rubber and in the exact shape of its receiving socket so that the load deflection ratio may be selected according to conditions of operation. In fact, it is contemplated that the cars on a line of rough track may be equipped with one type of rubber and the cars operating under more favorable conditions may be equipped with a different type of rubber and that the operator of the cars may change the buttons as he may desire.

The driving motors 26 are provided where the trucks are to be self-propelled. They are supported directly by lateral members 27, one end 28 of each of which is hingedly connected to a frame member 1 or 2, and the other end of each thereof is supported on the frame members by spring nests 29a composed of a coil spring having a block of rubber concentrically therein. A similar spring nest 29 yieldingly resists upward movement of the members 27. These motors each has a propeller shaft 30 for driving certain gears contained by the axle housing 31 which drive the axles 4. Torque arms 32 integral with the axle housings 31 extend into brackets 33 integral with the frame members 1 and 2. These brackets have pockets to receive the arms 31 and to be cushioned with respect thereto by rubber pads 34 as shown—Figure 9. A pin 35 is inserted through openings in the top and bottom walls of each bracket 33 and extends through aligned openings in the rubber pads 34 and the torque arm 32.

Various modifications may be made without departing from the scope of my invention. For instance it is no consequence to my invention whether the cap 16 is between the coils and the bolster or between the coils and the frame members. I therefore desire to be extended protection as defined by the appended claims.

What I claim is:

1. In a rail truck, spaced axles having wheels and journal bearings, a truck frame comprising two identical sections, each of said sections having a first end formation and a second formation to receive directly the two journal bearings respectively of one of said axles and to retain said bearings against relative fore and aft and lateral movement with respect thereto, said first end formation being of interior and exterior arcuate shape, each of said sections also including a side rail integral therewith which terminates in a further formation of interior arcuate shape to receive the arcuate top of the first end formation of the other of said sections immediately above a journal bearing of the other of said axles whereby any one of said wheels is capable of elevation with respect to the other of said wheels but is rigidly held by said frame against out-of-parallel relation in response to horizontal forces, said sections being held in engagement with said bearings by gravity and freely removable from engagement with said journal bearings by vertical elevation therefrom.

2. In a rail truck, spaced axles having wheels and journal bearings, a truck frame comprising two identical sections, each of said sections having a formation to receive directly the journal bearings of one of said axles and to retain said bearings against relative fore and aft and horizontal movement with respect thereto, each of said sections also including a side rail which carries at its outer end a further formation to receive the top of one end of the other of said sections immediately above a journal bearing of the other of said axles, any one of said wheels is capable of elevation with respect to the others of said wheels but rigidly held by said frame against out-of-parallel relation in response to horizontal forces, said sections being held in engagement with said bearings by gravity and being freely removable from engagement with said journal bearings by vertical elevation therefrom, the ends of each of said side rails which overlie an end of the other of said sections being separated therefrom by a rubber pad.

3. In a rail truck, spaced axles having wheels and journal bearings, a truck frame comprising two identical sections, each of said sections having a formation to receive directly the journal bearings of one of said axles and to retain said bearings against relative fore and aft and horizontal movement with respect thereto, each of said sections also including a side rail which carries at its outer end a further formation to receive the top of one end of the other of said sections immediately above a journal bearing of the other of said axles, any one of said wheels is capable of elevation with respect to the others of said wheels but rigidly held by said frame against out-of-parallel relation in response to horizontal forces, said sections being held in engagement with said bearings by gravity and being freely removable from engagement with said journal bearings by vertical elevation therefrom, and housings for said axles each having gearing therein for the rotation of one of said axles, and torque arms connecting said housings and said frame and members.

4. In a rail truck, spaced axles having wheels and journal bearings, a truck frame comprising two identical sections, each of said sections having two formations to receive the journal bearings at each end of one of said axles, each said formation having parallel sides which merge into an arcuate top portion having substantially the same radius as that of the journal bearings whereby said bearings of each axle are held thereby against relative movement with respect to one of said sections, said sections each having an integral side frame terminating in an arcuate portion adapted to overlie the arcuate formation of the other end of the other of said sections, said sections freely resting on said bearings and upon each other and being separable from engagement with said bearings and each other merely by vertical elevation thereof.

EMIL H. PIRON.

REFERENCES CITED

The following references are of record in the file of this patent:

UNITED STATES PATENTS

| Number | Name | Date |
| --- | --- | --- |
| 1,640,180 | Buckwalter | Aug. 23, 1927 |
| 1,640,963 | Sanders | Aug. 30, 1927 |
| 1,765,432 | Lamont | June 24, 1930 |
| 1,955,915 | Howard et al. | Apr. 24, 1934 |
| 2,166,858 | Bugatti | July 18, 1939 |
| 2,184,102 | Piron | Dec. 19, 1939 |
| 2,251,950 | Piron | Aug. 12, 1941 |